Figure 1:
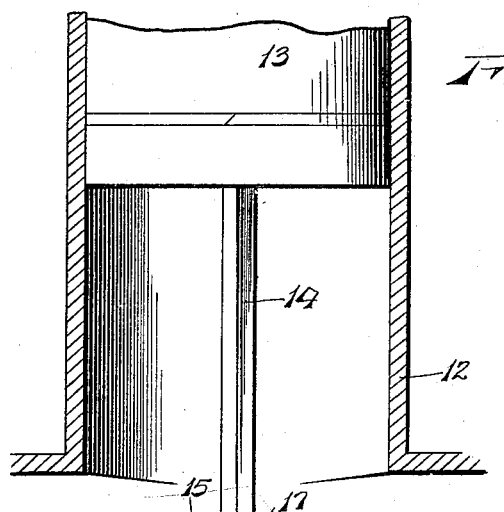

Jan. 6, 1925.  1,521,971

M. A. SHARP

SHAFT TRUING DEVICE

Filed June 18, 1921

Inventor
M. A. Sharp

By Lacey & Lacey, Attorneys

Patented Jan. 6, 1925.

1,521,971

UNITED STATES PATENT OFFICE.

MARLAY A. SHARP, OF LINCOLN, NEBRASKA.

SHAFT-TRUING DEVICE.

Application filed June 18, 1921. Serial No. 478,680.

*To all whom it may concern:*

Be it known that I, MARLAY A. SHARP, a citizen of the United States, residing at Lincoln, in the county of Lancaster and State of Nebraska, have invented certain new and useful Improvements in Shaft-truing Devices, of which the following is a specification.

This invention relates to an improved shaft truing device, being especially designed for truing the crank pins of engine crank shafts, and has as one of its principal objects to provide a device of this character wherein the crank pins of the crank shaft of a vehicle engine may be trued without the necessity for removing the engine from the vehicle or removing the crank shaft itself from the engine.

The invention has as a further object to provide a device which may be readily applied and which in operation will accurately true the crank pins of a crank shaft.

And the invention has as a still further object to provide a device which may be employed for truing the crank pins of crank shafts of engines of substantially any conventional design.

Other and incidental objects will appear hereinafter.

Figure 2:
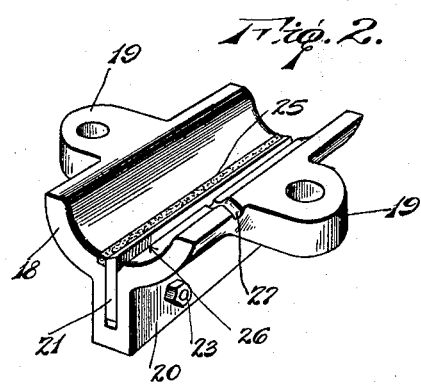
Figure 3:
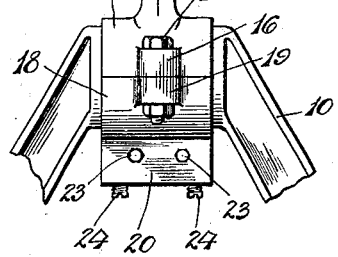
Figure 3:
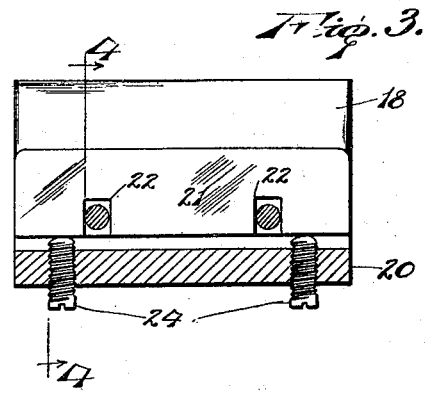
Figure 4:
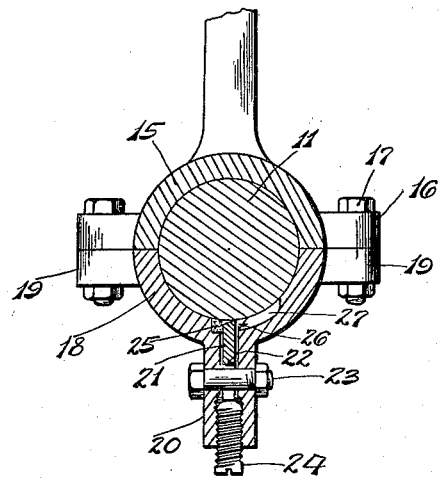

In the drawing:

Figure 1 is a fragmentary elevation showing my improved device in connection with the crank shaft and associated parts of an engine of conventional design, Figure 2 is a perspective view showing the device in detail, Figure 3 is a longitudinal section taken medially through the device, and Figure 4 is a transverse section on the line 4—4 of Figure 3, looking in the direction of the arrows.

Referring now more particularly to the drawing, I have, for convenience, shown my improved device in connection with the crank shaft and associated parts of an engine of conventional design. The crank shaft is indicated at 10 and one of the crank pins thereof at 11. One of the engine cylinders is indicated at 12 and reciprocable in said cylinder is a piston 13 from which extends a connecting rod 14 provided at its lower end with a bearing 15 having ears 16. The bearing cooperates, of course, with the crank pin 11 and normally coacting with said bearing is a bearing cap secured by the customary bolts 17, the cap and bearing, of course, surrounding the pin. All of this structure is well known, being in common use.

Coming now more particularly to the subject of the present invention, my improved truing device is formed with a semi-cylindrical body 18 adapted to mate with the bearing 15 of the connecting rod 14 and provided at opposite sides thereof with apertured ears 19 confronting the ears 17 of said bearing. Thus, after the usual bearing cap of the connecting rod has been removed, the present device may be applied about the crank pin 11, mating with the connecting rod bearing, the bolts 17 being, as shown in Figure 4, employed for securing the device in place. These bolts extend, of course, through the ears 19 and if found necessary, shims may be employed between these ears and the ears of the bearing 15 for properly spacing the device with respect to said bearing. Depending from the body 18 medially thereof is a longitudinally directed channel member 20 extending from end to end of the body and snugly but removably mounted in said member is a cutter or blade 21. As shown in Figure 3, the blade is provided with one or more vertical notches 22 opening through the lower edge of the blade and disposed in said notches are clamping bolts 23 extending freely through the sides of the channel member 20 and adjustable for tightly binding the blade within said member. Threaded through the bottom wall of the channel member are spaced adjusting screws 24 which may, as will be at once appreciated, be rotated for adjusting the cutter upwardly. As will be observed, the cutter is preferably provided with a beveled cutting edge and formed in the inner face of the body at the rear side of the cutter is a longitudinally disposed seat extending from end to end of the body, a wiper 25 of felt or other approved material being arranged in said seat. At the forward side of the cutter, the inner face of the body is beveled to provide a combined shavings and oil groove 26 and leading into said groove at a point medially thereof is a second groove 27 in the inner face of the body, the latter groove extending, at its outer end, as shown in Figure 2, across one side edge of the body.

In use, the usual bearing cap of the bearing 15 of the connecting rod 14 is, as previously indicated, removed when, as explained, the device is applied to the bearing.

By loosening the bolts 23, the screws 24 may then be adjusted for advancing the cutter 21 against the crank pin 11 when, by tightening said bolts, the cutter will be rigidly held to properly engage the crank pin. Accordingly, the crank shaft 10 may then be rotated by any approved means for turning the crank pin 11 with respect to the cutter so that the cutter will be caused to shave off the crank pin for truing the pin. As the cutting operation progresses oil may, of course, be readily introduced into the groove 27 to flow into the groove 26 for preventing overheating of the cutter while shavings will also collect within this latter groove to be discharged at the ends thereof. However, to prevent any shavings from trailing the cutter as well as also to efficiently wipe the crank pin during the cutting operation, the wiper 25 is provided. It will accordingly be seen that I provide a highly efficient device for the purpose set forth and one which may be readily employed in connection with any ordinary internal combustion engine. After any one of the pins of a crank shaft has been trued, the device may, of course, be detached and reapplied for successively truing the other pins of the crank shaft, it being observed that in order to thus true the crank shaft pins it is unnecessary to remove the crank shaft from the engine or to remove the engine from the vehicle upon which it is mounted. Further, it is unnecessary to remove the engine head or the pistons. The device will thus effect a great saving of labor while, due to its simplicity and consequent low cost, anyone can afford to own and use the device.

Having thus described the invention, what is claimed as new is:

In a shaft truing device, the combination with a cap shaped bottom bearing to fit about a crank shaft mating with the crank shaft bearing of a connecting rod and formed with a longitudinally disposed channel, and means extending transversely through the channel and adjustable for clamping a cutter therein holding the side walls of the channel against spreading, of a cutter fitting in said channel and provided at its lower edge with a notch accommodating said clamping means to lock the cutter against endwise movement and opening through the lower edge of the cutter whereby the cutter may be inserted in said channel without displacing said clamping means, said notch being elongated to permit the cutter to be adjustably advanced, the upper forward inner corner of the channel being beveled to form an oil groove at the forward side of the cutter and the bottom bearing being provided in its inner face with an oil groove leading from the former groove across one side edge of said bottom bearing whereby oil may be introduced into the former groove through the latter groove without displacing the bottom bearing.

In testimony whereof I affix my signature.

MARLAY A. SHARP. [L. S.]